United States Patent
Kang et al.

(10) Patent No.: US 8,000,738 B2
(45) Date of Patent: Aug. 16, 2011

(54) MOBILE TERMINAL WITH LEAKAGE CURRENT PREVENTION

(75) Inventors: Sung-Hee Kang, Seoul (KR); Hyong-Kyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 735 days.

(21) Appl. No.: 11/843,460

(22) Filed: Aug. 22, 2007

(65) Prior Publication Data

US 2008/0119246 A1 May 22, 2008

(30) Foreign Application Priority Data

Nov. 16, 2006 (KR) .................. 10-2006-0113528
Jan. 17, 2007 (KR) .................. 10-2007-0005415

(51) Int. Cl.
*H04M 1/00* (2006.01)
*H04B 1/16* (2006.01)
*H04B 1/10* (2006.01)

(52) U.S. Cl. ............... 455/550.1; 455/195.1; 455/299

(58) Field of Classification Search ............ 455/77, 455/550.1, 575.1, 573, 114.1, 117, 120, 127.1, 455/195.1, 197.3, 232.1, 296, 299

See application file for complete search history.

(56) References Cited

U.S. PATENT DOCUMENTS

| 5,680,078 | A  | * | 10/1997 | Ariie .................. 332/178 |
| 6,603,807 | B1 | * | 8/2003  | Yukutake et al. ........ 375/222 |
| 6,711,397 | B1 | * | 3/2004  | Petrov et al. ........... 455/324 |
| 7,181,179 | B2 | * | 2/2007  | Fujisawa et al. ........ 455/129 |
| 7,389,129 | B2 | * | 6/2008  | Shoji ................. 455/575.5 |
| 7,493,149 | B1 | * | 2/2009  | Doyle et al. ............ 455/574 |
| 7,725,123 | B2 | * | 5/2010  | Takebe ................ 455/550.1 |
| 2004/0125521 | A1 | * | 7/2004 | Salling et al. ............ 361/56 |
| 2004/0203529 | A1 | * | 10/2004 | Hong et al. ............ 455/90.3 |
| 2005/0159195 | A1 | * | 7/2005 | Huber et al. .......... 455/575.5 |
| 2006/0268489 | A1 | * | 11/2006 | Sung .................. 361/212 |
| 2006/0270472 | A1 | * | 11/2006 | Chen et al. ........... 455/575.7 |

FOREIGN PATENT DOCUMENTS

CN 1479549 A 3/2004

* cited by examiner

*Primary Examiner* — Andrew Wendell
(74) *Attorney, Agent, or Firm* — Birch, Stewart, Kolasch & Birch, LLP

(57) ABSTRACT

A mobile terminal including a terminal housing having a first ground, a printed circuit board disposed in the terminal housing and having a second ground, and a leakage current preventing member installed between the first and second grounds and configured to block a direct current (DC) and passing an alternating current (AC) so as to prevent a leakage current from flowing to the terminal housing during a recharging of the mobile terminal.

16 Claims, 4 Drawing Sheets

MOBILE TERMINAL WITH LEAKAGE CURRENT PREVENTION

This application claims priority to Korean Patent Applications No. 10-2007-0005415 filed on Jan. 17, 2007, and No. 10-2006-0113528 filed on Nov. 16, 2006, the entire contents of which are hereby incorporated by reference in their entirety.

BACKGROUND OF THE INVENTION

1. Field of the Invention

The present invention relates to a mobile terminal, and more particularly to a mobile terminal having a current leakage preventing mechanism for preventing a leakage current from flowing to a terminal housing when the mobile terminal is being charged.

2. Description of the Background Art

Mobile terminals generally include a terminal case formed of a metallic material, or have a decoration on the terminal housing that is formed of a metallic material. The mobile terminals also include a ground to deal with the electromagnetic radiation, static electricity, antenna functions, etc. caused when the mobile terminal is operated.

For example, a mobile terminal may include a ground layer formed at an inner surface of the terminal housing. Alternatively, the metallic terminal housing may itself function as the ground. However, one problem with the related art mobile terminal is that a user gets shocked when the user uses the terminal (e.g., places a call, views text messages, etc.) when the mobile terminal is being charged. That is, a ground potential of the terminal is changed when the terminal is being charged based on the charger output amount. Accordingly, a potential difference exists between the Earth potential and the ground potential. The potential difference causes a leakage current to be generated, which then flows to the terminal housing and shocks a user using the terminal.

SUMMARY OF THE INVENTION

Accordingly, one object of the present invention is to address the above-noted and other problems.

Another object of the present invention is to provide a current leakage preventing mechanism that passes an alternating current and blocks a direct current to prevent a leakage current from flowing to the terminal housing when the terminal is used while it is simultaneously being charged to thus prevent a user from being shocked while at the same time maintaining the radio and static electricity performance of the terminal.

To achieve these and other advantages and in accordance with the purpose of the present invention, as embodied and broadly described herein, the present invention provides in one aspect a mobile terminal including a terminal housing having a first ground, a printed circuit board disposed in the terminal housing and having a second ground, and a leakage current preventing member installed between the first and second grounds and configured to block a direct current (DC) and pass an alternating current (AC) so as to prevent a leakage current from flowing to the terminal housing during a recharging of the mobile terminal.

In another aspect, the present invention provides a mobile terminal including a terminal housing, a printed circuit board disposed inside the terminal housing and having a first ground, and a display module disposed in the terminal housing and configured to display information, in which the display module has a second ground connected to the first ground of the printed circuit board. Also included is a leakage current preventing member configured to block a direct current (DC) and pass an alternating current (AC) so as to prevent a leakage current from flowing to the terminal housing during a recharging of the mobile terminal.

In still another aspect, the present invention provides a mobile terminal including a first terminal housing including an input device configured to input information and a printed circuit board, a second terminal housing openably mounted at the first terminal housing and including a display module configured to display information, a first leakage current preventing member disposed between a ground of the printed circuit board and the first terminal housing and configured to block a direct current (DC) and pass an alternating current (AC), and a second leakage current preventing member installed between a ground of the display module and the second terminal housing and configured to block the DC and pass the AC.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

One method of preventing the current from leaking (hereinafter "leakage current") is to install a control switch between a first ground of the terminal housing and a second ground of a printed circuit board included in the mobile terminal. A command is then send to the control switch to switch to a first state to disconnect the first and second grounds when the terminal is being charged and to switch to a second state to connect the first and second grounds when the terminal has finished charging. However, such a control switch has a complicated structure, increases the cost of manufacturing the terminal, and tends to break after repeated use. In addition, when the terminal is used while it is being charged, the control switch blocks the connection between the first and second grounds, which reduces the radio sensitivity of the terminal and deteriorates the electrostatic and electromagnetic radiation performance of the terminal.

Therefore, it is preferable to provide the terminal with a leakage current preventing mechanism that passes an alternating current and blocks a direct current to prevent a leakage current from flowing to the terminal housing when the terminal is used and while it is simultaneously being charged to thus prevent a user from being shocked while at the same time maintaining the radio and static electricity performance of the terminal. FIGS. 1-6 illustrate embodiments of such a preventing mechanism included in a mobile terminal.

Figure 1:
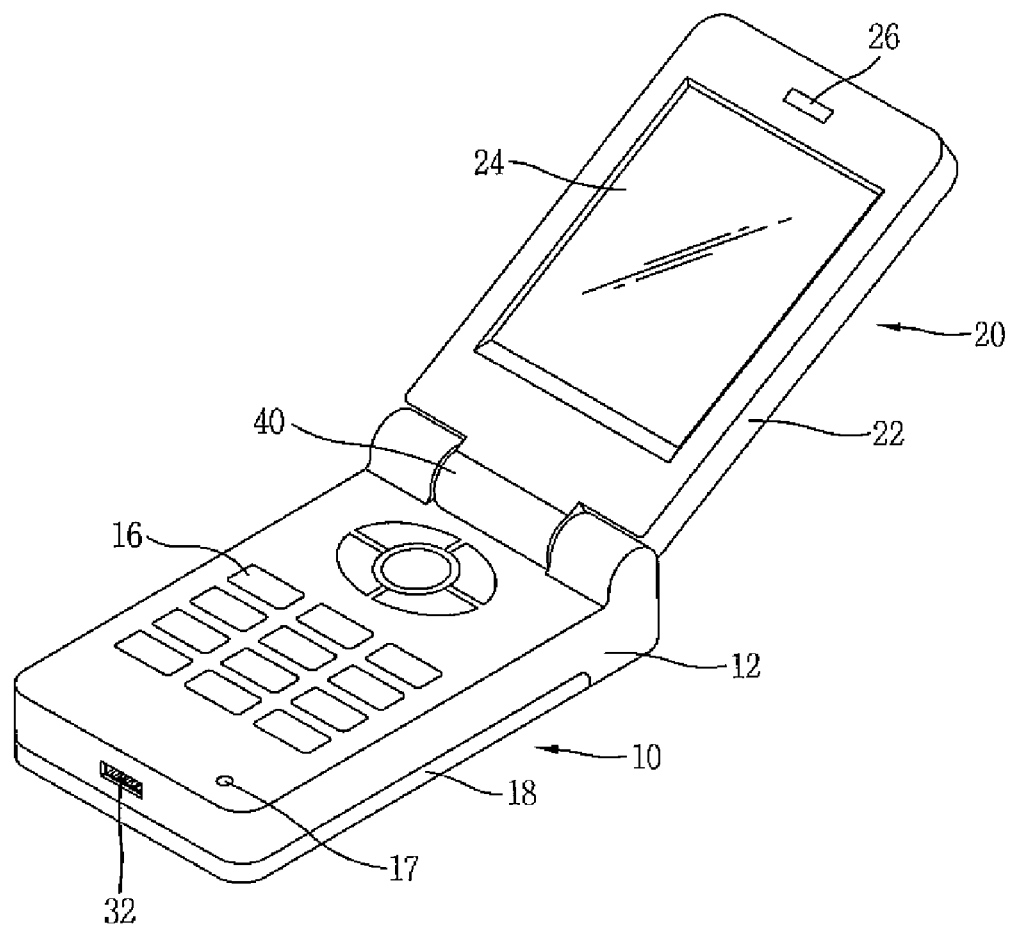
FIG. 1 is a perspective view showing a mobile terminal according to one embodiment of the present invention.

In more detail, FIG. 1 is a perspective view showing a mobile terminal according to one embodiment of the present invention. As shown, the mobile terminal includes a first body 10 and a second body 20 openably connected to the first body 10 via a hinge connection portion 40. Further, the first body 10 includes a first housing 12 forming an overall appearance of the terminal, a keypad 16 mounted at a front surface of the first housing 12 for inputting information into the terminal, and a battery 18 detachably mounted at a rear surface of the first housing 12 for supplying power to the terminal. The first body 10 of the mobile terminal also includes a microphone 17 mounted at one side of the first body 10 and a charger connector 32 for connecting the terminal to an external power source for recharging the battery 18 of the terminal.

In addition, the first housing 12 may be made of a metallic material to enhance its appearance. In this instance, the metallic housing 12 can itself serve as a ground and thereby also increasing the overall ground area. The larger ground area also increases the RF radio and radiation performance of terminal. Similarly, a metal decoration may be printed on a non-metallic terminal housing. In this instance, the metal decoration may be used as an additional ground of the terminal.

Further, the second body 20 includes a second housing 22 rotatably connected to one end of the first body 10 via the hinge connecting portion 40, a display module 24 mounted in the second housing 22 and a speaker 26. Similar to the first housing 12, the second housing 22 may be formed of a metallic material or may include a metallic decoration.

Figure 2:
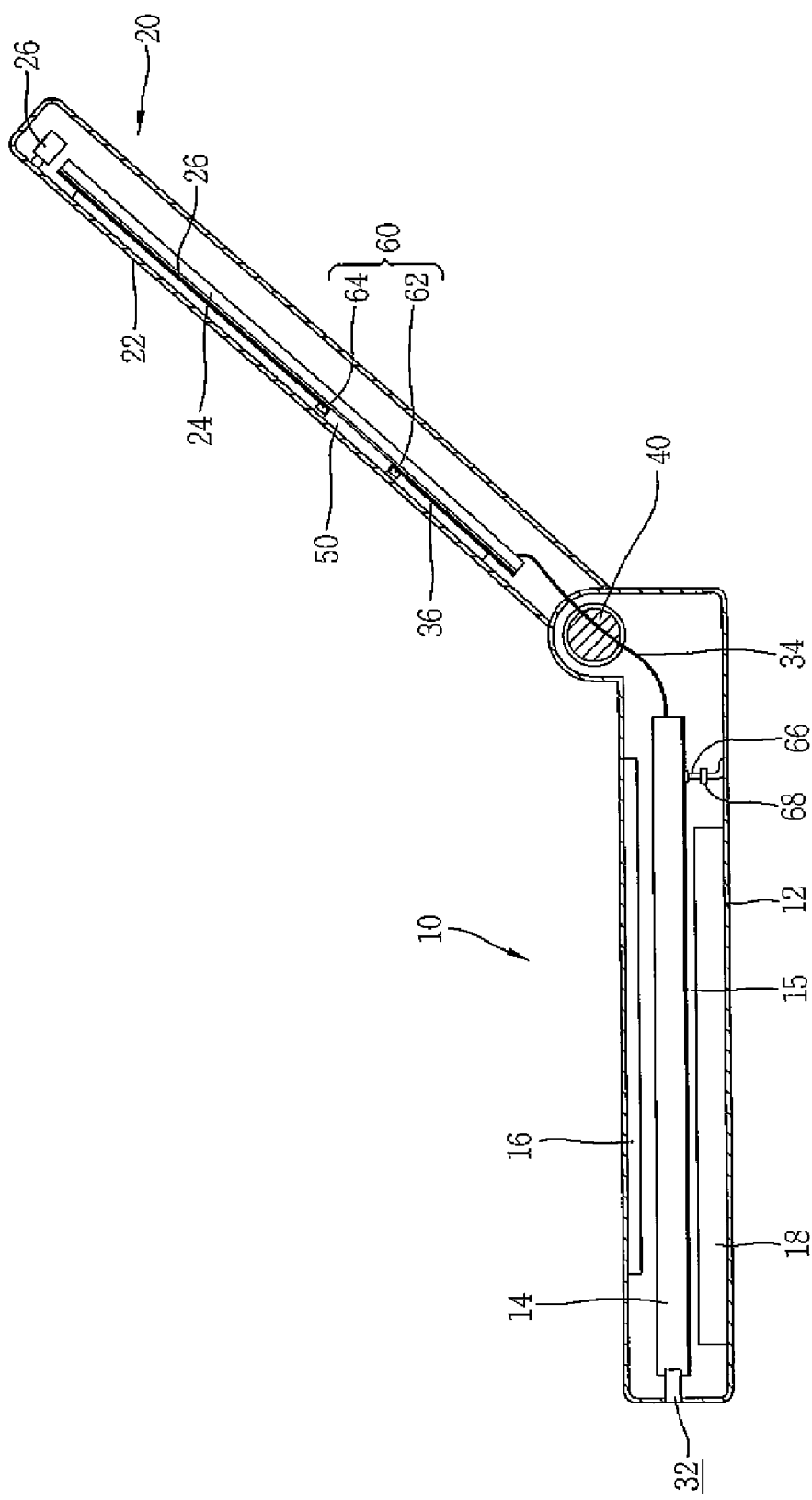
FIG. 2 is a sectional view showing a mobile terminal according to one embodiment of the present invention.

Next, FIG. 2 is a sectional view showing a mobile terminal according to one embodiment of the present invention. As shown, a main printed circuit board 14 is mounted inside the first housing 12. The main printed circuit board 14 includes several different circuit components that are used for operating the mobile terminal, and also has a first ground 15 on a surface of the circuit board 14. Further, the charge connector 32 is mounted at one side of the main printed circuit board 14 and is electrically connected to the ground 15 of the main printed circuit board 14.

In addition, the display module 24 has a display printed circuit board 26 that is electrically connected to the main printed circuit board 14 via an FPCB (Flexible Printed Circuit Board) 34 so as to send/receive signals to and from the main printed circuit board 14. A second ground 36 is also formed on a surface of the display printed circuit board 26, and is connected to the first ground 15 of the main printed circuit board 14 via the FPCB 34.

Figure 3:
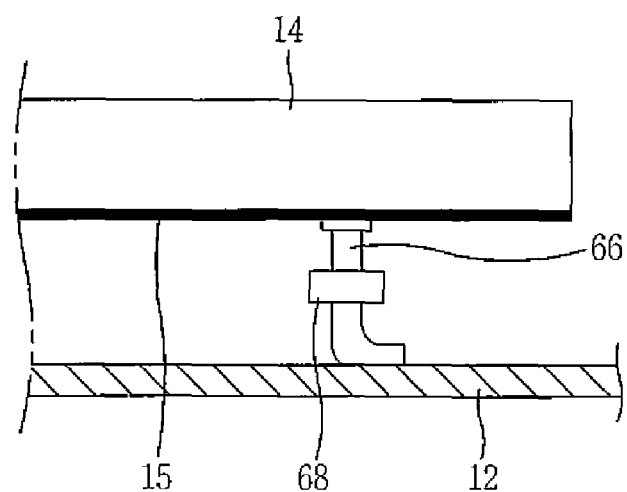
FIG. 3 is a sectional view showing a part of a first body of a mobile terminal according to one embodiment of the present invention.
Figure 4:
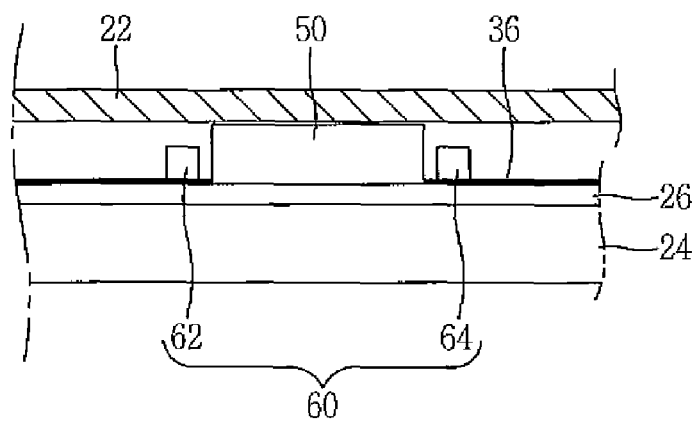
FIG. 4 is a sectional view showing a part of a second body of a mobile terminal according to one embodiment of the present invention.

In addition, the main printed circuit board 14 and the first housing 12 are connected to each other via a coupling member 66 so as to enlarge the ground area. A first leakage current preventing member 68 is mounted at the coupling member 66 so that a leakage current generated when a charger is connected to the terminal via the charger connector 32 is prevented from flowing to the surface of the first housing 12. FIG. 3 is an enlarged view of the coupling member 66 and first leakage current preventing member 68.

The second housing 22 also includes a coupling member 50 for electrically coupling to the second housing 22 and display ground 36. A second leakage current preventing member 60 is mounted at the coupling member 50 so that the leakage current is prevented from flowing to the surface of the second housing 22. Further, the coupling member 50 is preferably implemented as a conductive EMI (Electromagnetic Interference) gasket. Also, as shown in the enlarged view of FIG. 4, both ends of the coupling member 50 contact the display ground 36, and the surface of the coupling member 50 contacts the second housing 22, thereby connecting the display ground 36 and the metallic second housing 22 to each other and enlarging the ground area. That is, the first and second grounds 15 and 36 formed on the main printed circuit board 14 and the display printed circuit board 26, respectively, enlarge the overall ground area by being electrically connected to the first and second metallic terminal housings 12 and 22. The enlarged ground area enhances the RF radio performance and the static electricity and electromagnetic waves and a radiation performance of the terminal.

Figure 5:
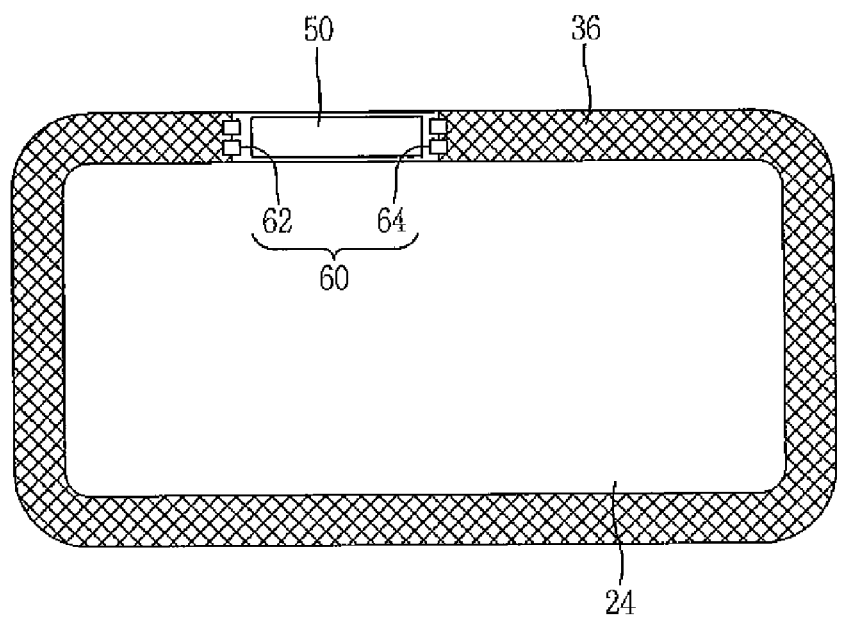
FIG. 5 is a front view showing a display unit of a mobile terminal according to one embodiment of the present invention.

In addition, as shown in FIGS. 1 and 3, the second leakage current preventing member 60 includes a first preventing member 62 connected between the display ground 36 and one end of the coupling member 50, and a second preventing member 64 connected between the display ground 36 and another end of the coupling member 50. Further, the leakage current preventing members 60 and 68 are preferably implemented as a capacitor, which passes an AC (Alternating Current) and blocks a DC (Direct Current). Note that FIG. 5 illustrates the second leakage current preventing member 60, the coupling member 50 and the second ground 36 surrounding the display 24 in a top view.

An operation of the mobile terminal according to an embodiment of the present invention will now be described. When a charger is connected to the mobile terminal via the charger connector 32, the ground potential of the terminal is changed based on the ground potential of the charger output, thereby generating small leakage currents due to the difference between the earth potential and the ground potential.

Further, because the first ground 15 of the main printed circuit board 14 is connected to the first housing 12 via the coupling member 66, the leakage current attempts to flow to the first housing 12. In addition, because the first ground 15 is connected to the second housing 22 via the FPCB 34 and the second ground 36, the generated leakage current attempts to flow to the surface of the second housing 22.

However, the leakage current is prevented from contacting the user when he or she is using the terminal while it is simultaneously being charged via the first and second leakage current preventing members 68 and 60. In addition, because the first and second leakage current preventing members 68 and 60 are implemented as a capacitor, these members pass the alternating current and block the direct current. Therefore, the user is prevented from being shocked via the direct current (leakage current), while at the same time the user can still use his or her mobile while the terminal is being charged (i.e., because the alternating current is passed through the first and second leakage current preventing members 68 and 60).

Figure 6:
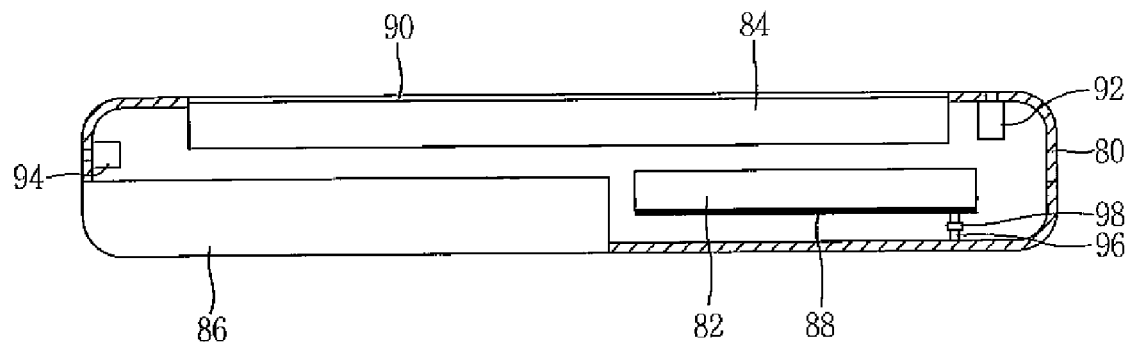
FIG. 6 is a sectional view showing a mobile terminal according to a second embodiment of the present invention.

Next, FIG. 6 is a sectional view showing a mobile terminal according to a second embodiment of the present invention. As shown, the mobile terminal includes a terminal housing 80, a main printed circuit board 82 including several circuit components and having a ground 88 on the surface thereof, a display module 84 mounted at the terminal housing 80, a touch pad 90 attached to a front surface of the display module 84, and a battery 86 mounted at a rear surface of the terminal housing 80. Further, the terminal also includes a speaker 92 mounted at one side of the terminal housing 80, and a microphone 94 mounted at another side thereof.

A ground 88 is also formed on a surface of the main printed circuit board 82, and when the terminal housing 80 is formed of a metallic material, the housing 80 serves as an additional ground. Further, the ground 88 of the main printed circuit board 82 is connected to the terminal housing 80 via a coupling member 96. A leakage current preventing member 98 is also installed at the coupling member 96. Similar to the first embodiment, the leakage current preventing member 98 blocks the DC and passes the AC. That is, the leakage current preventing member 98 is preferably implemented as a capacitor, which blocks the DC and passes the AC. Accordingly, when user uses the terminal while the battery 86 is being charged, the leakage current is prevented from flowing to the terminal housing 80. Also, the RF radio and radiation performance of the static electricity and electromagnetic waves is enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
   a terminal housing forming an external face of the mobile terminal and allowing a user to physically contact the terminal housing, the terminal housing formed of a metallic material such that the terminal housing increases an overall ground area, the terminal housing serving as a first ground;
   a printed circuit board disposed in the terminal housing and having a second ground; and
   a leakage current preventing member connected between the first ground of the terminal and the second ground of the printed circuit board and configured to block a direct current (DC) and pass an alternating current (AC) so as to prevent a leakage current from flowing to the terminal housing during a recharging of the mobile terminal.

2. The mobile terminal of claim 1, further comprising:
   a metallic decoration formed on the terminal housing,
   wherein the metallic decoration serves as the first ground.

3. The mobile terminal of claim 1, further comprising:
   a coupling member disposed between the printed circuit board and the terminal housing and configured to electrically couple the first and second grounds,
   wherein the leakage current preventing member is installed at the coupling member.

4. The mobile terminal of claim 1, wherein the leakage current preventing member comprises at least one capacitor.

5. A mobile terminal, comprising:
   a terminal housing forming an external face of the mobile terminal and allowing a user to physically contact the terminal housing, the terminal housing formed of a metallic material such that the terminal housing increases an overall ground area, the terminal housing serving as a first ground;
   a printed circuit board disposed inside the terminal housing and having a second ground;
   a display module disposed in the terminal housing and configured to display information, said display module having a third ground connected to the second ground of the printed circuit board; and
   a leakage current preventing member connected between the first ground of the terminal and the second ground of the printed circuit board and configured to block a direct current (DC) and pass an alternating current (AC) so as to prevent a leakage current from flowing to the terminal housing during a recharging of the mobile terminal.

6. The mobile terminal of claim 5, further comprising:
   a coupling member configured to couple the printed circuit board to the terminal housing.

7. The mobile terminal of claim 6, wherein the leakage current preventing member is disposed on the coupling member.

8. The mobile terminal of claim 5, further comprising:
   a coupling member configured to couple the display module to the terminal housing.

9. The mobile terminal of claim 8, wherein first and second ends of the coupling member are electrically connected to the ground of the display module, and a surface of the coupling member contacts the terminal housing.

10. The mobile terminal of claim 9, wherein the leakage current preventing member includes a first preventing member mounted between the first end of the coupling member and the ground of the display module, and a second preventing member mounted between the second end of the coupling member and the ground of the display module.

11. The mobile terminal of claim 5, wherein the leakage current preventing member comprises at least one capacitor.

12. A mobile terminal, comprising:
   a first terminal housing forming a first external face of the mobile terminal and allowing a user to physically contact the first terminal housing, the first terminal housing formed of a metallic material such that the first terminal housing increases an overall ground area, the first terminal housing serving as a first ground, and including an input device configured to input information and a printed circuit board;
   a second terminal housing openably mounted at the first terminal housing forming a second external face of the mobile terminal and allowing the user to physically contact the second terminal housing, the second terminal housing formed of a metallic material such that the second terminal housing increases an overall ground area, the terminal housing serving as a second ground; and including a display module configured to display information;
   a first leakage current preventing member connected between a ground of the printed circuit board and the first ground of the first terminal housing and configured to block a direct current (DC) and pass an alternating current (AC); and
   a second leakage current preventing member connected between a ground of the display module and the second ground of the second terminal housing and configured to block the DC and pass the AC.

13. The mobile terminal of claim 12, further comprising:
   a first coupling member configured to couple the printed circuit board to the first terminal housing; and
   a second coupling member configured to couple the display module to the second terminal housing.

14. The mobile terminal of claim 13, wherein the first leakage current preventing member is disposed on the first coupling member.

15. The mobile terminal of claim 13, wherein the second leakage current preventing member includes one preventing member mounted between a first end of the second coupling member and the ground of the display module, and another preventing member mounted between a second end of the second coupling member and the ground of the display module.

16. The mobile terminal of claim 12, wherein each of the first and second leakage current preventing members comprises at least one capacitor.

* * * * *